US009705413B2

(12) United States Patent
Zhang et al.

(10) Patent No.: US 9,705,413 B2
(45) Date of Patent: *Jul. 11, 2017

(54) MULTI-MODE OPERATION AND CONTROL OF A RESONANT CONVERTER

(71) Applicant: Infineon Technologies AG, Neubiberg (DE)

(72) Inventors: Guoxing Zhang, Singapore (SG); Mingping Mao, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 17 days.

This patent is subject to a terminal disclaimer.

(21) Appl. No.: 14/832,469

(22) Filed: Aug. 21, 2015

(65) Prior Publication Data

US 2015/0357927 A1    Dec. 10, 2015

Related U.S. Application Data

(63) Continuation of application No. 13/409,922, filed on Mar. 1, 2012, now Pat. No. 9,143,043.

(51) Int. Cl.
*H02M 3/335* (2006.01)
*H02M 1/00* (2006.01)
*H02M 3/337* (2006.01)

(52) U.S. Cl.
CPC ... *H02M 3/33569* (2013.01); *H02M 3/33507* (2013.01); *H02M 3/33546* (2013.01); (Continued)

(58) Field of Classification Search
CPC . H02M 2001/0025; H02M 2001/0035; H02M 3/335; H02M 3/33507; H02M 3/33569
See application file for complete search history.

(56) References Cited

U.S. PATENT DOCUMENTS

| 4,679,129 A | 7/1987 | Sakakibara et al. |
| 5,751,565 A * | 5/1998 | Faulk ............... H02M 3/33507 363/21.15 |

(Continued)

FOREIGN PATENT DOCUMENTS

| CN | 1485972 | 3/2004 |
| DE | 3687999 | 7/1993 |
| WO | 2004064237 A1 | 7/2004 |

OTHER PUBLICATIONS

Office Action received in DE102013003429.9, mailed May 8, 2014, 5 pages.

*Primary Examiner* — Fred E Finch, III
(74) *Attorney, Agent, or Firm* — Slater Matsil, LLP

(57) ABSTRACT

In accordance with an embodiment, a method of controlling a switched-mode power includes generating a feedback signal proportional to an output of the switched-mode power supply, and operating the switched-mode power supply in a normal mode. If the feedback signal crosses a first threshold, the switched-mode power operates in a second operating mode. In the first operating mode the pulse modulated signal is adjusted to regulate a feedback signal to a first signal level, and in the second operating mode, a dead-time of the pulse modulated signal is adjusted to signal to regulate a feedback signal to a second signal level different from the first signal level. The method further includes driving a switch of the switched-mode power supply with the pulse modulated signal.

20 Claims, 7 Drawing Sheets

(52) U.S. Cl.
CPC .. *H02M 3/3376* (2013.01); *H02M 2001/0025* (2013.01); *H02M 2001/0035* (2013.01); *Y02B 70/1433* (2013.01); *Y02B 70/16* (2013.01)

(56) References Cited

U.S. PATENT DOCUMENTS

| | | | |
|---|---|---|---|
| 6,898,090 B2 | 5/2005 | Nishida et al. | |
| 7,529,105 B1* | 5/2009 | Choi | H02M 3/33523 363/131 |
| 7,696,733 B2 | 4/2010 | Osaka | |
| 7,944,085 B2 | 5/2011 | Kyono | |
| 8,009,448 B2 | 8/2011 | Liu | |
| 8,213,189 B2 | 7/2012 | Nishikawa | |
| 8,274,801 B2* | 9/2012 | Shi | H02M 3/156 363/21.03 |
| 8,385,089 B2 | 2/2013 | Kyono | |
| 8,395,912 B2 | 3/2013 | Usui | |
| 8,416,588 B2 | 4/2013 | Chen | |
| 9,143,043 B2* | 9/2015 | Zhang | H02M 3/33546 |
| 2008/0049453 A1 | 2/2008 | Osaka | |
| 2008/0130324 A1* | 6/2008 | Choi | H02M 3/33507 363/21.03 |
| 2009/0284991 A1 | 11/2009 | Nishikawa | |
| 2010/0014331 A1* | 1/2010 | Moon | H02M 3/33507 363/89 |
| 2010/0039834 A1* | 2/2010 | Moon | H02M 3/33523 363/21.09 |
| 2011/0002145 A1 | 1/2011 | Halberstadt | |
| 2011/0051465 A1 | 3/2011 | Usui | |
| 2012/0113689 A1* | 5/2012 | Chen | H02M 3/33523 363/21.17 |
| 2012/0127761 A1* | 5/2012 | Halberstadt | H02M 3/337 363/21.02 |
| 2012/0250378 A1* | 10/2012 | Kok | H02M 3/156 363/78 |
| 2013/0003421 A1* | 1/2013 | Fang | H02M 3/33523 363/21.01 |
| 2013/0193849 A1 | 8/2013 | Zimmermann et al. | |
| 2013/0200707 A1 | 8/2013 | Hartmann et al. | |
| 2013/0241509 A1* | 9/2013 | Chung | G05F 1/46 323/282 |
| 2013/0301307 A1 | 11/2013 | Kardolus et al. | |
| 2014/0003094 A1* | 1/2014 | Sorensen | H02M 3/337 363/21.02 |
| 2014/0028092 A1* | 1/2014 | Takeshima | B60L 11/1812 307/10.1 |

* cited by examiner

MULTI-MODE OPERATION AND CONTROL OF A RESONANT CONVERTER

This is a continuation application of U.S. application Ser. No. 13/409,922, entitled "Multi-Mode Operation and Control of a Resonant Converter" which was filed on Mar. 1, 2012, and is incorporated herein by reference.

TECHNICAL FIELD

An embodiment of the invention relates generally to electronic power conversion and methods, and more particularly to the use of a controller for a power switch in a switched-mode power converter.

BACKGROUND

Switching converters are widely used in the field of power conversion. A switching converter includes at least one switch that is configured to generate a pulse-width modulated (PWM) voltage from an input voltage, and a rectifier arrangement that receives the PWM voltage and generates an output voltage to be supplied to a load. Usually the rectifier arrangement includes at least one inductive storage element, such as a choke, and at least one capacitive storage element, such as a capacitor. The PWM voltage is generated by switching the switching element on and off in accordance with a PWM drive signal. The drive signal is provided by a controller dependent on the output voltage. The controller is configured to vary the duty cycle of the drive signal in order to control the output voltage such that it assumes a given set-voltage.

The duty cycle of the drive signal is dependent on a power consumption of the load, whereas the duty cycle increases when the power consumption increases, and the duty cycle decreases when the power consumption decreases. Under low-load conditions, which occur when a power consumption of the load is very low, some modern controllers enter a burst mode. In the burst mode, the switching element is cyclically switched on and off during a burst-on period and the switching element remains permanently in an off-state during a burst-off period subsequent to the burst-on period. The burst-on period and the burst-off period define a burst period $T_{BP}$ and a burst frequency $f_{BP}$, where $f_{BP}=1/T_{BP}$. The burst frequency may be dependent on several parameters, such as the input voltage, and the power consumption of the load.

SUMMARY OF THE INVENTION

In accordance with an embodiment, a method of controlling a switched-mode power includes generating a feedback signal proportional to an output of the switched-mode power supply, and operating the switched-mode power supply in a normal mode. If the feedback signal crosses a first threshold, the switched-mode power operates in a second operating mode. In the first operating mode the pulse modulated signal is adjusted to regulate a feedback signal to a first signal level, and in the second operating mode, a dead-time of the pulse modulated signal is adjusted to signal to regulate a feedback signal to a second signal level different from the first signal level. The method further includes driving a switch of the switched-mode power supply with the pulse modulated signal.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be redescribed in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

Figure 1:
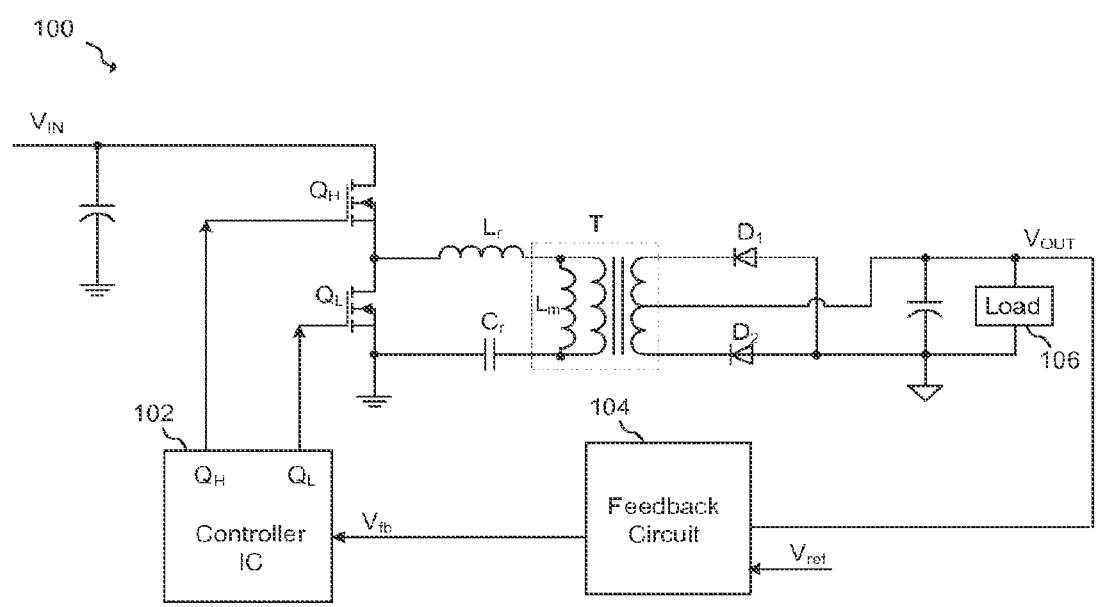
FIG. 1 illustrates a schematic drawing of an embodiment resonant half-bridge power converter.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a resonant switched-mode power converter formed with a controller that is configured to operate in a power saving switching mode during low load conditions. Embodiments of the present invention may also be applied to other types of electronic power conversion devices and other power conversion architectures.

A switched-mode power converter (also referred to as a "power converter" or "regulator") is a power supply or power processing circuit that converts an input voltage waveform into a specified output voltage waveform. DC-DC power converters convert a DC input voltage which may be time varying into a DC output voltage. Controllers associated with the power converters manage an operation thereof by controlling conduction periods or switching frequencies of switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a duty cycle of power switches of a hard-switched power converter or a switching frequency of the power switches of a resonant power converter. The duty cycle is a ratio represented by a conduction period of a power switch to a switching period thereof. Thus, if a switch conducts for half of the switching period, the duty cycle for the power switch would be 0.5 (or 50%). Additionally, as voltage or current for systems, such as a microprocessor powered by the power converter, dynamically change (e.g., as a computational load on a load microprocessor changes), the controller is configured to dynamically increase or decrease the duty cycle or the switching frequency of the power switches therein to maintain an output characteristic, such as an output voltage, at a desired value. A controller for a power converter is generally formed as an integrated circuit with conductive pins that are soldered or otherwise electrically bonded to a printed wiring board in an end product.

To provide the voltage conversion and regulation functions, the power converters include active power switches such as metal-oxide semiconductor field-effect transistors ("MOSFETs") that are coupled to the input voltage source and periodically switch a reactive circuit element such as an inductor to the voltage source at a switching frequency that may be on the order of 100 kHz or higher. To provide a DC output voltage, the power converters include diodes to provide a rectification function. When high power conversion efficiency is desired, synchronous rectifiers may be substituted for the rectifying diodes.

Turning initially to FIG. 1, illustrated is a schematic drawing of an embodiment of resonant half-bridge power converter 100 to illustrate the operation thereof. This half-bridge topology is often referred to as an inductor-inductor-capacitor ("LLC") power train circuit topology wherein a duty cycle of each primary-side power switch is set to about 50%, and the switching frequency $f_s$ is varied to control an output characteristic such as an output voltage. As switching frequency $f_s$ is varied, the effective gain of the switching converter changes as switching frequency $f_s$ changes in relation to the resonant frequency of the power converter. In practice, the duty cycle of each primary-side power switch is set to slightly less than 50% to avoid current shoot-through during switching transitions.

The resonant half-bridge power converter is coupled to an input voltage source $V_{IN}$ and includes controller 102 that regulates a power converter output characteristic such as an output voltage by regulating a switching frequency $f_s$ of the power converter. Controller 102 together with feedback circuit 104 of the power converter senses the output voltage $V_{out}$ of the power converter and a desired output voltage $V_{ref}$ and controls switching frequency $f_s$ of the primary-side power switches to regulate the output voltage $V_{OUT}$ at the desired output voltage $V_{ref}$.

The power converter provides power to a system or load 106 coupled to the output $V_{out}$. While in the illustrated embodiment the power train employs a half-bridge resonant power converter topology, those skilled in the art should understand that other converter topologies such as an isolated resonant full-bridge power converter topology are well within the broad scope of the present invention.

The power converter further includes feedback circuit 104 that is employed to transmit a sensed output characteristic across the isolation boundary provided by the power transformer T to the controller 102. Various circuit devices such as an opto-isolator to provide this isolation function are well known in the art and will not be described further herein in the interest of brevity.

In the primary side of the circuit, two series-coupled power switches, MOSFETs $Q_H$ and $Q_L$, are coupled to two inductors, resonant inductor $L_r$ and the primary winding of the power transformer T, and to capacitor $C_r$. Inductance $L_m$ represents the magnetizing inductance of transformer T, and diodes D1 and D2 are secondary side rectifier diodes. In alternative embodiments, synchronous rectifier power switches may be employed in place of diodes D1 and D2.

The resonant frequency of the LLC power train circuit topology is $f_{RES}$. The resonant frequency $f_{RES}$ can be estimated from the equation $$f_{RES} = \frac{1}{2\pi \times \sqrt{L_r \times C_r}},$$

where $L_r$ and $C_r$ are the inductance and capacitance respectively of the indicated primary-side power train circuit elements illustrated in FIG. 1.

Half bridge LLC resonant switched mode power converters are widely used due to their high conversion efficiency. Embodiment half bridge LLC resonant power converters may be configured to achieve zero voltage switching for primary side switches, and zero current switching for secondary side rectifiers under a wide input voltage range under different load conditions. However, in embodiments that employed a frequency controlled gain, frequency $f_s$ that corresponds to a no load condition may be theoretically infinite. In many conventional half bridge LLC resonant power converters, the power converter is still operated in a first normal mode under no load or very light load conditions.

Figure 2:
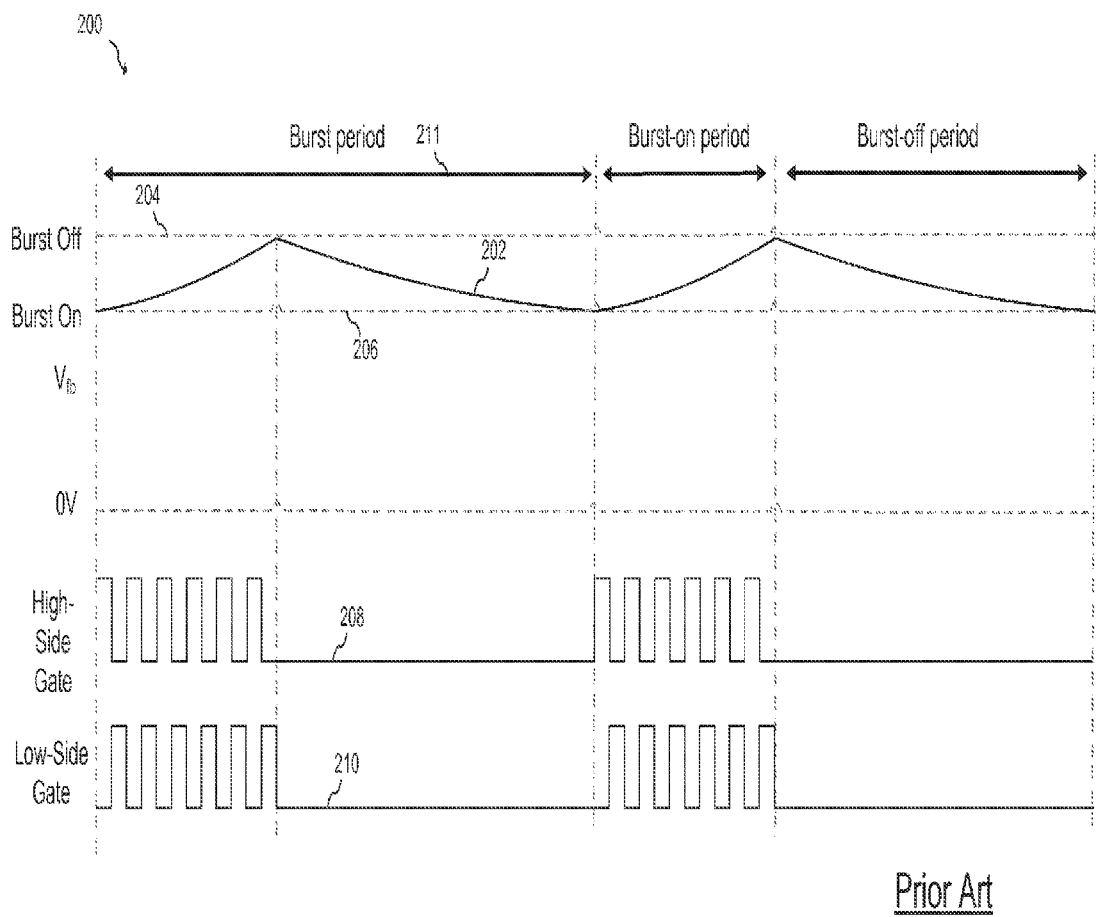
FIG. 2 illustrates a graphical representation of waveforms for a conventional resonant half-bridge power converter.

Turning to FIG. 2, waveform diagram 200 illustrates a conventional LLC burst mode operation strategy. Waveform trace 202 represents a feedback voltage input ($V_{fb}$) to an LLC switching controller, waveform trace 208 illustrates the gate drive signal for a high side switching transistor, and waveform trace 210 illustrates the gate drive signal for a low side switching transistor. When an LLC resonant switched mode power converter enters a no load or a very light load condition, the feedback circuit indicates this condition by generating a larger error signal. When a feedback signal $V_{fb}$ falls below burst-on threshold voltage 206, the power supply controller enters a burst mode, and both high side switch drive signal 208 and low side switch drive signal 210 turn on in an alternative manner during the first portion of burst period 211. During the burst mode, switch drive signal 208 may be operated using a fixed frequency or a programmable frequency. In some cases, this frequency is set using external components such as resistors and/or capacitors or programming via an external pin. The frequency may be selected by optimizing a trade-off between conduction losses and MOSFET switching losses. In some conventional LLC resonant switched-mode power supplies, the burst mode switching frequency varies according to the feedback voltage during the burst-on period. For example, if the feedback voltage increases, there is a corresponding increase in the switching frequency.

After a number of switching cycles, feedback voltage $V_{fb}$ exceeds burst off threshold voltage 204, and high side switch drive signal 208 and low side switch drive signal 210 are accordingly shut down during the second portion of burst period 211. During this time both the high side switching transistor and the low side switching transistor are turned off. Accordingly, feedback voltage $V_{fb}$ begins to decrease due to the lack of switching activity. When feedback voltage $V_{fb}$ once again crosses burst-on threshold 206, high side switch drive signal 208 and low side switch drive signal 210 are once again activated and the burst period repeats itself. If a heavy load is coupled to the LLC power converter, feedback voltage $V_{fb}$ falls below burst-on threshold 206, and the LLC power converter enters a normal operation mode.

Figure 3:
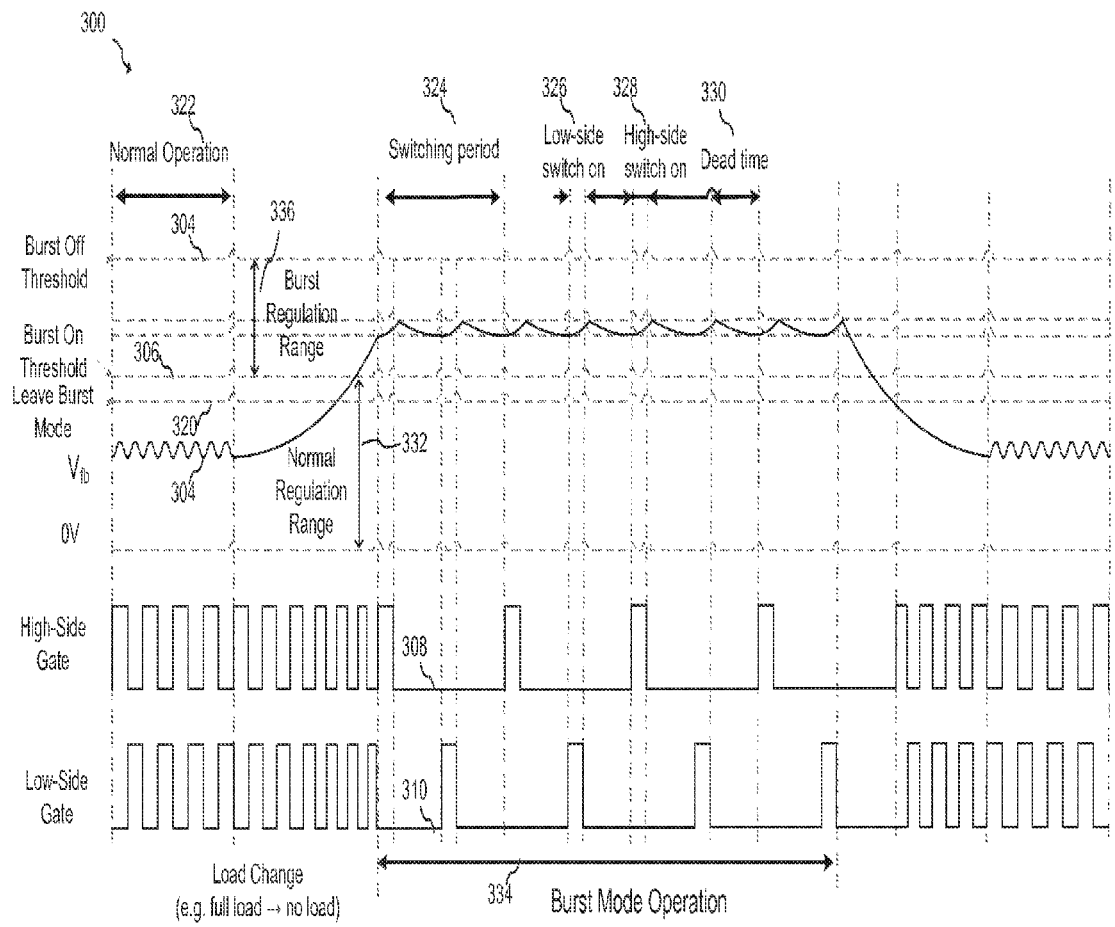
FIG. 3 illustrates a graphical representation of waveforms for an embodiment resonant half-bridge power converter.

FIG. 3 illustrates waveform diagram 300 representing an embodiment low power consumption burst mode operation method. In an embodiment, the power supply operates during normal operation period 322 by varying the frequency of high side switch drive signal 308 and low side switch drive signal 310. During normal operation, feedback voltage $V_{fb}$ is regulated within normal regulation range 332. When feedback voltage $V_{fb}$ exceeds burst on threshold 306, the power supply enters embodiment low power burst mode operation period 334 in which dead time 330 between high side switch drive signal switch on time 328 and low side switch drive signal switch on time 326 is varied in order to regulate the feedback voltage 304 within the first regulation range 336. In an embodiment, there is no burst-on period or burst off period; rather, high side switch drive signal 308 and low side switch drive signal 310 are periodically and alternately pulsed at a low-frequency having switching period 324.

When feedback voltage $V_{fb}$ exceeds burst off threshold 304, switch drive signals 308 and 310 are disabled such that both power supply switches are turned off to stop energy flowing to the output capacitor and load. On the other hand, if feedback voltage $V_{fb}$ drops below threshold 320 signifying an increase in the load to the power supply, the power supply controller exits the burst mode and normal operation is resumed. In some embodiments, the on time over the dead time is calculated using an average value of feedback voltage $V_{fb}$ and the duty cycle to ensure that the embodiment LLC resonant converter works at an optimal point during the embodiment burst mode.

Figure 4:
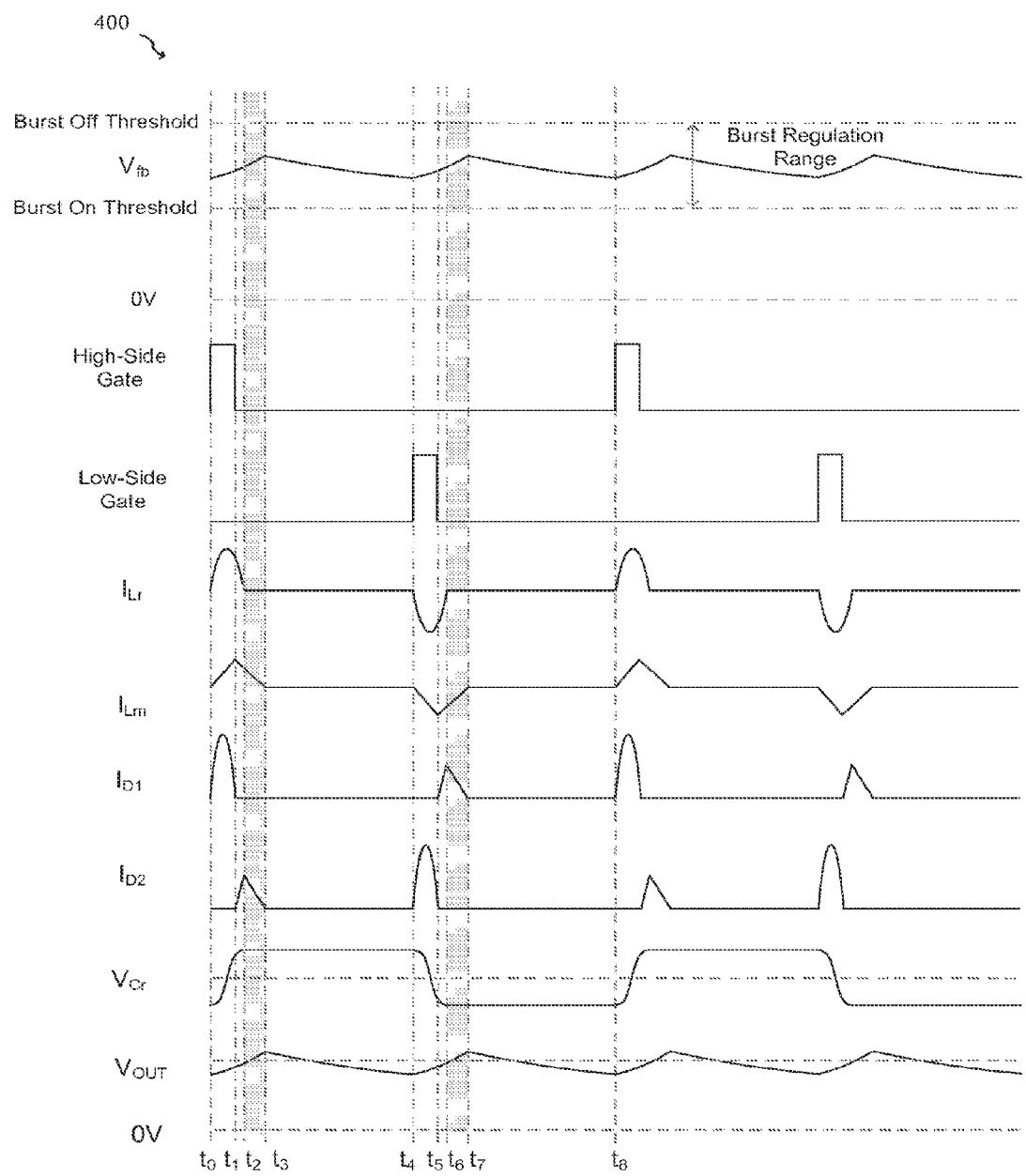
FIG. 4 illustrates a further graphical representation of waveforms for an embodiment resonant half-bridge power converter.

FIG. 4 shows waveform diagram 400 illustrating the operation of an embodiment low power consumption burst mode for the power converter of FIG. 1. In the diagram, $V_{fb}$ represents the feedback voltage, $I_{Lr}$ represents the current through resonant inductor $L_r$, $I_{Lm}$ represents the magnetizing current through the power transformer T, $I_{D1}$ and $I_{D2}$ represents the current through secondary-side diodes D1 and D2, respectively. $V_{Cr}$ represents the voltage across resonant capacitor $C_r$, and $V_{OUT}$ represents the output voltage.

From time $t_0$ to $t_1$, high-side switch $Q_H$ is turned on and input voltage $V_{IN}$ is applied to the resonant tank, thereby causing energy to flow from the input of the power converter to the output of the power converter. During this period, $L_r$ and $C_r$ start to resonate and the magnetizing current $I_{Lm}$ increases as well. The voltage across $C_r$ increases from its minimum value to its peak, and the secondary-side current flows through diode $D_1$ to the output capacitor and the load. Moreover, during this period, resonant current $I_{Lr}$ is larger than magnetizing current $I_{Lm}$, which means that the secondary-side current $I_{D1}$ is about $n*(I_{Lr}-I_{Lm})$, where n is the transformer turns ratio of transformer T. Therefore, the output voltage increases as well as the feedback voltage.

From $t_1$ to $t_2$, high-side switch $Q_H$ is turned off, and the magnetizing current $I_{Lm}$ begins to decrease as the resonant current $I_{Lr}$ decreases to zero. In this period, $I_{Lr}$ flows through the body diode of the low-side switch $Q_L$, while $V_{Cr}$ continues to increase. At $t_2$, however, $I_{Lr}$ drops to zero and $V_{Cr}$ reaches its peak value. Also, current starts to flow through diode $D_2$ at the secondary side. During this time period, the resonant current $I_{Lr}$ is less than the magnetizing current $I_{Lm}$, and the secondary-side current $I_{D2}$ is about $n*(I_{Lm}-I_{Lr})$. Therefore, the output voltage continues to increase as well as the feedback voltage.

From $t_2$ to $t_3$, the resonant current has dropped to zero, but the magnetizing current has yet to reach zero current. During this period, the remaining magnetizing current is transferred to the secondary side, similar to what is seen in a flyback converter. Current also flows though diode $D_2$ on the secondary side. In an embodiment, some of the magnetizing current is transferred to the secondary side. During this period, the resonant current $I_{Lr}$ drops to zero, thus the secondary-side current $I_{D2}$ is about $n*I_{Lm}$, since there is still some magnetizing current. Again, the output voltage continues to increase as well as the feedback voltage.

From $t_3$ to $t_4$, both the high-side and the low-side switches are turned off. Because the magnetizing current has already decreased to zero, there is no current flowing to the secondary side, and the voltage across $C_r$ almost keeps constant. During this period, both the output voltage and feedback voltage $V_{fb}$ is decreasing.

From $t_4$ to $t_8$, the low-side switch turns on to allow the energy stored in the resonant capacitor to transfer to the secondary-side output, and the behavior of the system is similar as the period from $t_0$ to $t_4$.

In some embodiments, power consumption is reduced with respect to conventional burst modes because a portion of the magnetizing current is transferred to the secondary side output capacitor and load during the period from $t_2$ to $t_3$ and during the period from $t_6$ to $t_7$, rather than continually circulating inside the primary side resonant tank.

Figure 5:
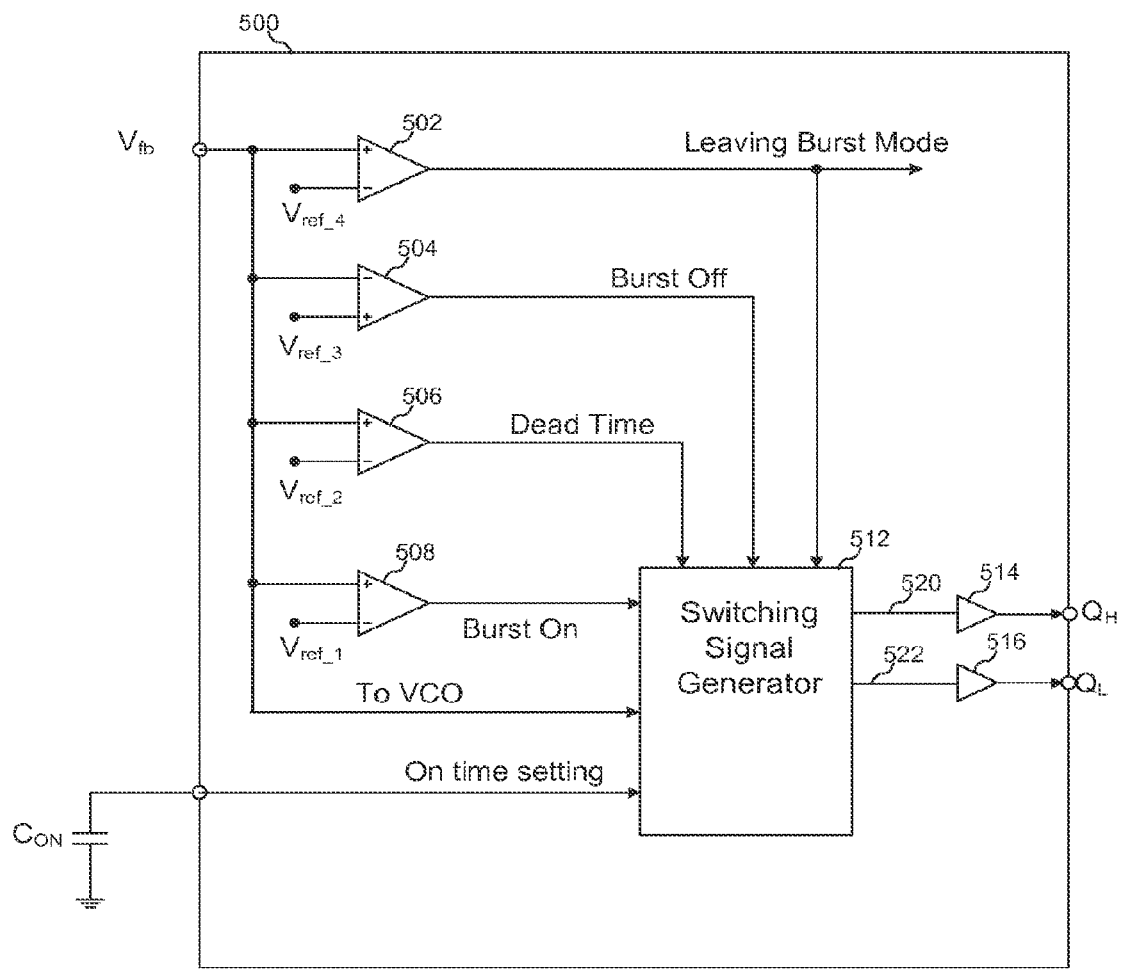
FIG. 5 illustrates a block diagram of a portion of an embodiment power supply controller integrated circuit.

FIG. 5 illustrates embodiment power supply controller integrated circuit 500 used to implement an embodiment low power burst mode. Power supply controller integrated circuit 500 has switching signal generator 512 that generates switching signals 520 and 522, switching signal drivers 514 and 516 that are used to drive switching signals $Q_H$ and $Q_L$, amplifier 506, and comparators 502, 504, and 508. In alternative embodiments, amplifier 506 may be a comparator. In some embodiments, dead time generation may be implemented within switching signal generator 512.

In an embodiment, power supply controller integrated circuit 500 may be integrated on a single integrated circuit. Alternatively, some or all of the functionality of integrated circuit 500 may be partitioned across a number of integrated circuits or a number of board level discrete components.

In an embodiment, amplifier 506, comparators 502, 504, and 508 compare feedback voltage $V_{FB}$ with a number of threshold voltages. Here $V_{ref\_1}$ is burst-on threshold, $V_{ref\_2}$ is a reference voltage for dead time calculation, $V_{ref\_3}$ is burst-off threshold, and $V_{ref\_4}$ is a threshold for exiting the burst mode. In an embodiment, when comparator 508 senses that feedback voltage $V_{FB}$ exceeds $V_{ref\_1}$, switching signal generator 512 changes its operation mode from normal mode to an embodiment burst mode. The dead time may be controlled by the feedback voltage which is determined by the external feedback circuits in some embodiments. If comparator 504 senses that feedback voltage $V_{FB}$ exceeds $V_{ref\_3}$, the switching signal generator de-asserts signals $Q_H$ and $Q_L$ in order to shut off the switching transistors of the switched mode power supply until feedback voltage $V_{fb}$ returns below $V_{ref\_1}$. On the other hand, if comparator 502 senses that feedback voltage $V_{fb}$ falls below $V_{ref\_4}$, switching signal generator 512 changes its operation mode from the embodiment burst mode back into the normal mode when the load condition changes from a low load condition to a normal load condition. In an embodiment, leaving burst mode threshold $V_{ref\_4}$ is less than burst-on threshold $V_{ref\_1}$ to provide some hysteresis in order to prevent noise on $V_{FB}$ from rapidly changing the mode of operation.

In an embodiment, feedback voltage $V_{fb}$ may be coupled to a frequency control input of a VCO block within switching signal generator 512 to produce a variable switching frequency for use, for example, during normal operation.

In an embodiment, $C_{ON}$ is an external capacitor that may be used to pre-define an on-time for the burst mode. In some embodiments $C_{ON}$ may be adjusted to provide on-times between about ¼ of the power converter's resonant period to about ¾ of power converter's resonant period. Alternatively, values outside of this range may be used. In some alternative embodiments, a resistor may be used instead of capacitor $C_{ON}$. By providing such adjustability, the designer of the power supply has the flexibility to find the power supply's point of operation that has the lowest power consumption.

In an embodiment, the dead time (from $t_1$ to $t_4$ in FIG. 4) is made to be longer than the time from that the magnetizing current through LLC power transformer decreases from its peak value to zero. In some embodiments, the minimum dead time may be determined based on the pre-set on time, for example, the minimum dead time may be made to be, for example, 1.5 times the on time. In alternative embodiments, the minimum dead time may be greater or less than 1.5 times the on time.

Figure 6A:
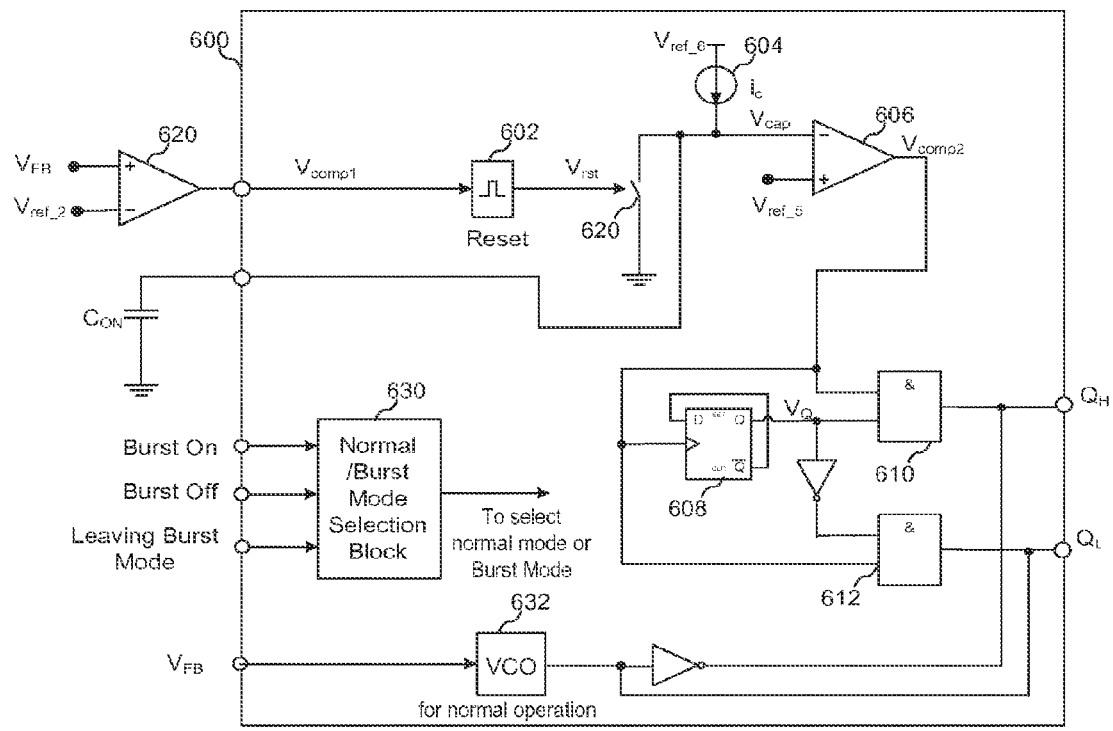
FIGS. 6a-b illustrate an embodiment switching signal generator and an associated timing diagram.
Figure 6B:
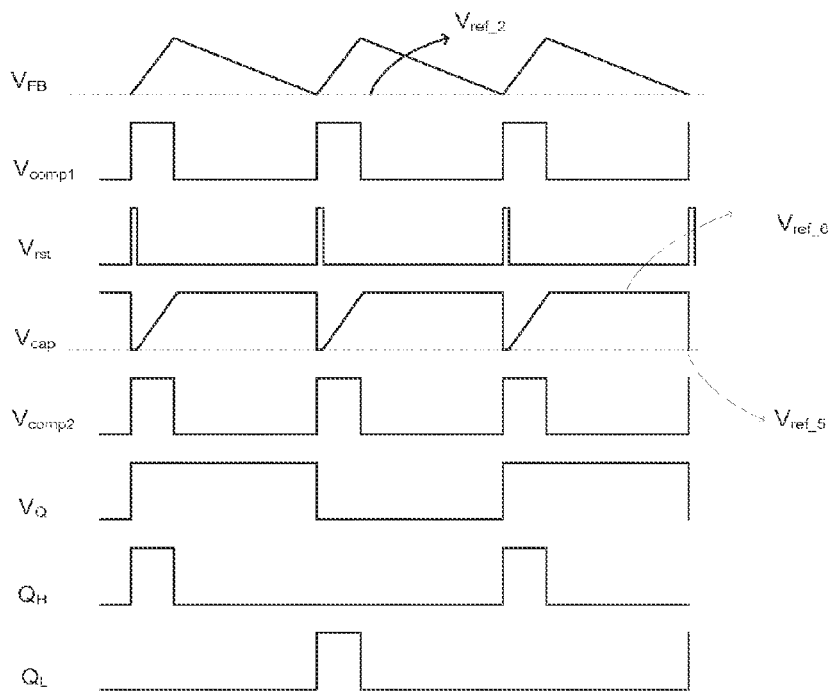

FIGS. 6a-b illustrate an embodiment switching signal generator 600 that may be used to implement switching signal generator block 512 in FIG. 5. In an embodiment, switching signal generator has reset block 602, current source 604, comparator 606, AND gates 610 and 612, and D flip-flop 608. Capacitor $C_{ON}$ may be implemented using an external capacitor that is used to set the on time. Alternatively, an internal capacitor may be used.

When the feedback voltage $V_{FB}$ is lower than voltage $V_{ref\_2}$, signal $V_{comp1}$ becomes high via comparator 620 and reset block 602 block turns on reset switch 620 for a certain time (e.g. 100 ns), as is shown in FIG. 6b. After switch 620 is turned off, comparator output $V_{comp2}$ turns on one gate driver and current $i_c$ from current source 604 charges capacitor $C_{ON}$. When the voltage across $C_{ON}$ reaches voltage $V_{ref\_5}$, $V_{comp2}$ becomes low and the gate driver is turned off. At this point in time, dead time begins. The dead time ends when feedback voltage $V_{FB}$ drops to $V_{ref\_2}$ again. In an embodiment, if feedback voltage $V_{FB}$ is higher than $V_{ref\_3}$, both driver signals $Q_H$ and $Q_L$ are pulled low, which generates a long break time until the feedback voltage recovers.

In an embodiment, signals Burst On, Burst Off, and Leaving Burst Mode are used to select between the normal operation mode and the burst mode via selection block 630. For example, switching signal generator 600 may be enabled via selection block 630 when the Leaving Burst Mode and Burst-on signals are high.

VCO 632 generates the variable frequency switching signal during normal operation. In an embodiment, the switching signal of the VCO 632 depends on $V_{FB}$. In an embodiment, feedback signal $V_{FB}$ may be used to control the frequency of VCO 632. During Burst Mode, VCO 632 may be disabled by selection block 630.

Figure 7:
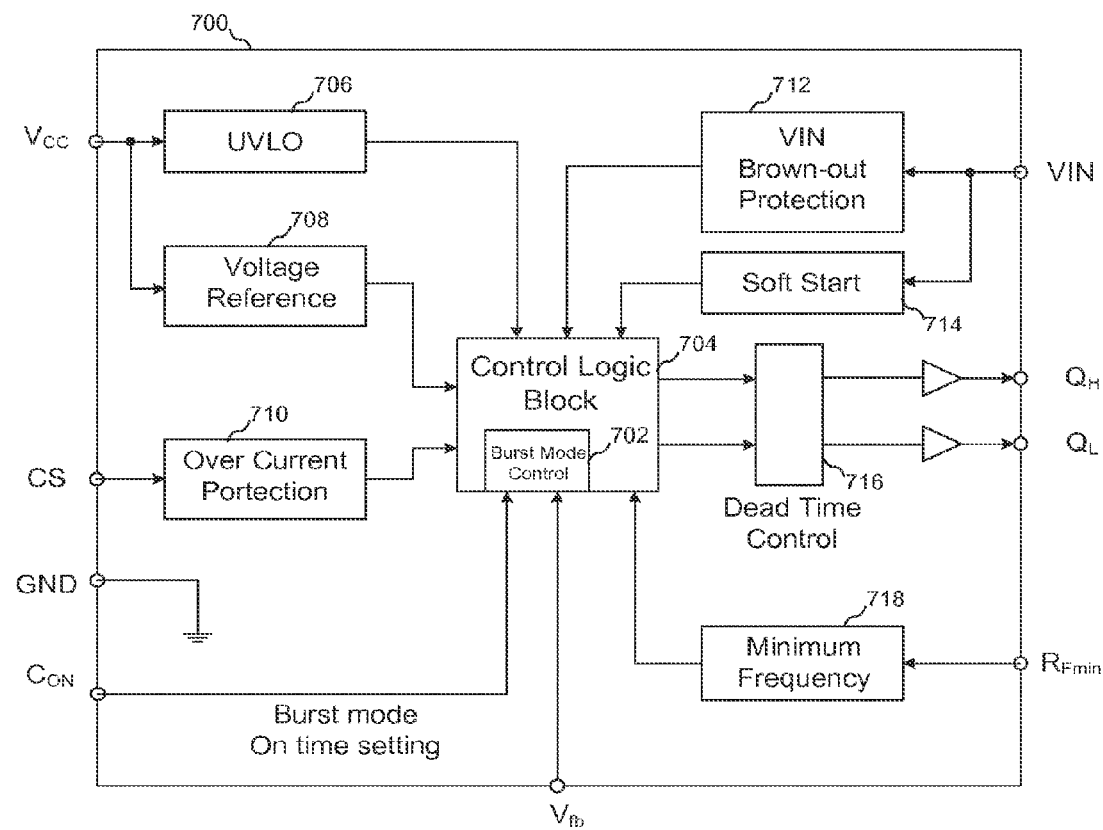
FIG. 7 illustrates an embodiment power controller integrated circuit.

FIG. 7 illustrates block diagram of embodiment LLC resonant converter IC 700. In an embodiment, burst mode control block 702 in control logic block 704 may be implemented using circuitry shown in FIG. 5 and in FIG. 6a. Converter IC 700 may also include undervoltage lockout block (UVLO) 706, voltage reference 708, over current protection block 710, VIN brown-out protection block 712, soft start block 714, dead time control block 716 and minimum frequency block 718. In an embodiment, UVLO block 706 provides a disable signal to control logic block 704. If VCC is below a certain threshold or operational value, voltage reference 708 generates voltage references for the comparators shown in FIGS. 5 and 6a. Overcurrent protection block 710 senses high current conditions via the CS pin. VIN brown-out protection block senses low voltage conditions on VIN, and stops the LLC operation when VIN falls below a desired level. Soft start block 714 provides soft start functionality that reduces MOSFET current stress during a LLC start-up phase. Dead time control block 716 controls the dead time for $Q_H$ and $Q_L$, and minimum frequency block 718 ensures that the power converter operates with a frequency higher than the minimum frequency based on a value of an external resistor coupled to pin $R_{Fmin}$.

In accordance with an embodiment, a method of controlling a switched-mode power supply includes generating a feedback signal proportional to an output of the switched-mode power supply, and operating the switched-mode power supply in a normal mode that includes adjusting a pulse modulated signal to regulate a feedback signal to a first signal level. If the feedback signal crosses a first threshold, the switched-mode power supply is operated in a second operating mode that includes adjusting a dead-time of the pulse modulated signal to regulate a feedback signal to a second signal level different from the first signal level. The method further includes driving a switch of the switched-mode power supply with the pulse modulated signal. In an embodiment, generating the feedback signal also includes generating the feedback signal based on a load requirement.

In some embodiments, the method further includes changing an operating mode of the switched-mode power supply from the second operating mode to the normal operating mode when the feedback signal crosses a second threshold. The second threshold may be between the first threshold and the first signal level in some embodiments. In an embodiment, the method also includes turning off the pulse modulated signal when the feedback signal crosses a third threshold.

In an embodiment, the pulse modulated signal includes a high-side switch signal and a low-side switch signal. In the normal operating mode, the time during which the high-side switch signal or the low-side switch signal is asserted may be greater than the dead-time between assertions of the high-side switch signal and the low-side switch signal. In the second operating mode, the dead-time between assertions of the high-side switch signal and the low-side switch signal may greater than the time during which the high-side signal or the low-side signal as asserted. In some embodiments, the time during which the high-side switch signal or the low-side switch signal is asserted is about 1.5 times greater than the dead-time between assertions of the high-side switch signal and the low-side switch signal. Also, the on-time of the pulse modulated signal may be constant in the second operating mode in some embodiments.

In an embodiment, the switched-mode power supply is a resonant power supply, and operating the switched-mode power supply in the normal mode includes adjusting a frequency of the pulse modulated signal to regulate the feedback signal to the first signal level.

In accordance with a further embodiment, a switch controller for a switched-mode power supply includes a first threshold detector coupled to a feedback signal of the switched-mode power supply, and a switching signal generator coupled to a feedback signal input and to an output of the first threshold detector. The switching signal generator is configured to generate a first pulse modulated signal in a normal operating mode to regulate a feedback signal to a first signal level, transition to a second operating mode when the output of the first threshold detector indicates that the feedback signal is has crossed the first threshold, and generate a second pulse modulated signal in a second operating mode to regulate a feedback signal to a second signal level by adjusting a dead-time of the pulse modulated signal. In an embodiment, the second signal level is different from the first signal level.

In an embodiment, the switch controller further includes an error amplifier. The error amplifier includes a first input coupled to the feedback signal, a second input coupled to a second mode reference voltage corresponding to the second signal level, and an output coupled to a dead-zone control input of the switching generator.

In an embodiment, the first threshold detector includes a first comparator comprising a first input coupled to the feedback signal, a second input coupled to a first threshold voltage corresponding to the first threshold signal, and an output coupled to a second mode control input of the switching signal generator. The switching signal generator may be configured to transition to the second mode when the second mode control input is asserted.

In an embodiment, the switch controller may also include a second comparator comprising a first input coupled to the feedback signal, a second input coupled to a second threshold voltage, and an output coupled to a second mode to normal mode transition input of the switching signal generator. The switching signal generator is configured to transition from the second mode to the normal mode when the second mode to normal mode transition input is asserted.

In an embodiment, the switching signal generator may further include an on-time setting input configured to be coupled to a reference capacitor, wherein an on-time of the pulse modulated waveform in the second mode depends on a capacitance of the reference capacitor. Furthermore, the switching signal generator may generate a high-side switch signal and a low-side switch signal. In some embodiments, the switch controller is disposed on an integrated circuit.

In an embodiment, the switched-mode power supply includes a resonant power supply, and the switching signal generator is configured to generate a first pulse modulated signal in the normal operating mode by adjusting a frequency of the first pulse modulated signal to regulate the feedback signal to the first signal level.

In accordance with a further embodiment, a switched mode power supply system includes a switching controller. The switching controller includes a first threshold detector coupled to a feedback signal of the switched-mode power supply, and a switching signal generator coupled to a feedback signal input and to an output of the first threshold detector. In an embodiment, the switching signal generator is configured to generate a first pulse modulated signal in a normal operating mode to regulate a feedback signal to a first signal level, transition to a second operating mode when the output of the first threshold detector indicates that the feedback signal has crossed the first threshold, and generate a second pulse modulated signal in a second operating mode to regulate a feedback signal to a second signal level by adjusting a dead-time of the pulse modulated signal. In an embodiment, the second signal level is different from the first signal level.

In some embodiments, the switched-mode power supply system also includes a switch driver coupled to the switching signal generator, a plurality power switches coupled to the switch driver, a power transformer coupled to the plurality of power switches, and a feedback interface circuit coupled between an output of the switched-mode power supply and a feedback input of the switching controller.

In an embodiment, the switched-mode power supply system also includes an inductor and a capacitor coupled between the plurality of power switches and the power transformer. The switched-mode power supply may be implemented as a resonant converter. In an embodiment, the switching signal generator is configured to generate the second pulse modulated signal having a fixed switch-on time, such that the fixed switched-on time is between ¼ and ¾ of a resonant period of the resonant converter.

Advantages of embodiments of the present invention include the ability to operate a high power rating power supply (50~250 W) in a no load condition having a power consumption of less than 0.3 W with a high power rating, thereby meeting some commercial power requirements, such as ENERGY STAR® requirements.

A further advantage of embodiment power converters is reduced ripple during no load or light load conditions. For example, in some embodiments output ripple of less than ±2% may be achieved. In some embodiments, this low-level of ripple may be achieved without appreciably increasing the capacitance of the output filter capacitor. In some embodiments, ripple is reduced because energy is delivered to the output capacitor continuously and because the output voltage is still under regulation during embodiment burst mode operation.

Another advantage of some embodiment power converters is that they maintain their efficiency under low-load conditions without having to fine-tune a burst-mode operating frequency. Also, some embodiment power converters are able to maintain output voltage regulation under no load or light load conditions without appreciable switching losses.

Processes and related methods described herein to form a controller were described substantially employing analog and logic circuit components. It is contemplated within the broad scope of the present invention that some of the processes and related methods may be implemented using digital circuit techniques such as by employing a microcontroller or a digital signal processor.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A method of controlling a switched-mode power supply, the method comprising:
   operating the switched-mode power supply in a normal operating mode comprising regulating a feedback signal to a first signal level; and
   when the feedback signal crosses a first threshold, operating the switched-mode power supply in a second operating mode comprising
   periodically asserting a high-side switch signal and a low-side switch signal having a dead-time between each assertion of the high-side switch signal and each assertion of the low-side switch signal, and
   adjusting the dead-time to regulate the feedback signal to a second signal level different from the first signal level.

2. The method of claim 1, further comprising generating the feedback signal based on a load requirement.

3. The method of claim 1, further comprising, changing an operating mode of the switched-mode power supply from the second operating mode to the normal operating mode when the feedback signal crosses a second threshold.

4. The method of claim 3, wherein the second threshold is between the first threshold and the first signal level.

5. The method of claim 1, further comprising de-asserting the high-side switch signal and the low-side switch signal when the feedback signal crosses a third threshold.

6. The method of claim 1, wherein:
in the normal operating mode, an assertion time during which the high-side switch signal or the low-side switch signal is asserted is greater than the dead-time between assertions of the high-side switch signal and the low-side switch signal; and
in the second operating mode, the dead-time between assertions of the high-side switch signal and the low-side switch signal is greater than the assertion time during which the high-side switch signal or the low-side switch signal as asserted.

7. The method of claim 6, wherein the assertion time during which the high-side switch signal or the low-side switch signal is asserted is about 1.5 times greater than the dead-time between assertions of the high-side switch signal and the low-side switch signal.

8. The method of claim 1, wherein an on-time of the high-side switch signal or of the low-side switch signal is constant in the second operating mode.

9. The method of claim 1, wherein:
the switched-mode power supply is a resonant power supply; and
operating the switched-mode power supply in the normal operating mode comprises adjusting a frequency of the high-side switch signal or of the low-side switch signal to regulate the feedback signal to the first signal level.

10. A switch controller comprising:
a first threshold circuit coupled to a feedback signal and configured to generate a mode select signal based on the feedback signal;
a second threshold circuit coupled to the feedback signal and configured to generate a low load signal based on the feedback signal;
a dead-time calculation circuit coupled to the feedback signal and configured to generate a dead-time signal based on the feedback signal; and
a switching signal generator circuit coupled to the first threshold circuit, the second threshold circuit, and the dead-time calculation circuit, the switching signal generator circuit configured to
alternate between a normal operating mode and a burst operating mode based on the mode select signal,
when in the burst operating mode, adjust a dead-time duration between assertions of a high-side switch signal and a low-side switch signal based on the dead-time signal, and
when in the burst operating mode, disable assertions of the high-side switch signal and the low-side switch signal based on the low load signal.

11. The switch controller of claim 10, wherein an output voltage is regulated at a first level in the normal operating mode and at a second level in the burst operating mode, the first level different from the second level.

12. The switch controller of claim 10, wherein
the first threshold circuit comprises
a first comparator configured to compare the feedback signal to a first threshold and generate a burst-on signal based on comparing the feedback signal to the first threshold, and
a second comparator configured to compare the feedback signal to a second threshold and generate a leaving burst mode signal based on comparing the feedback signal to the second threshold;

the mode select signal comprises the burst-on signal and the leaving burst mode signal; and
the switching signal generator circuit is configured to enter the burst operating mode when the burst-on signal is asserted and exit the burst operating mode when the leaving burst mode signal is asserted.

13. The switch controller of claim 12, wherein the second threshold circuit comprises a third comparator configured to compare the feedback signal to a third threshold and generate assertions of the low load signal based on comparing the feedback signal to the third threshold.

14. The switch controller of claim 13, wherein the dead-time calculation circuit comprises a fourth comparator configured to compare the feedback signal to a fourth threshold and generate the dead-time signal based on comparing the feedback signal to the fourth threshold.

15. The switch controller of claim 10, wherein the switching signal generator circuit comprises:
a mode select circuit coupled to the first threshold circuit and the second threshold circuit;
an on-time circuit coupled to the dead-time calculation circuit, wherein, when in the burst operating mode, the on-time circuit is configured to assert a switch enable signal for an on-time duration based on the dead-time signal; and
a switch drive logic circuit coupled to the on-time circuit, wherein, when in the burst operating mode, the switch drive logic circuit is configured to alternatingly assert the high-side switch signal and the low-side switch signal when the switch enable signal is asserted.

16. A method of operating a switch controller, the method comprising:
generating a mode select signal at a first threshold circuit based on a feedback signal;
generating a low load signal at a second threshold circuit based on the feedback signal;
generating a dead-time signal at a dead-time calculation circuit based on the feedback signal;
alternating between a normal operating mode and a burst operating mode based on the mode select signal;
when in the burst operating mode, adjusting a dead-time duration between assertions of a high-side switch signal and a low-side switch signal based on the dead-time signal; and
when in the burst operating mode, disabling assertions of the high-side switch signal and the low-side switch signal based on the low load signal.

17. The method of claim 16, further comprising:
regulating an output voltage at a first level in the normal operating mode; and
regulating the output voltage at a second level in the burst operating mode, the first level different from the second level.

18. The method of claim 16, wherein
the mode select signal comprises a burst-on signal and a leaving burst mode signal, and generating the mode select signal comprises generating the burst-on signal based on comparing the feedback signal to a first threshold and generating the leaving burst mode signal based on comparing the feedback signal to a second threshold; and
alternating between the normal operating mode and the burst operating mode based on the mode select signal comprises entering the burst operating mode when the burst-on signal is asserted and exiting the burst operating mode when the leaving burst mode signal is asserted.

19. The method of claim 18, wherein generating the low load signal comprises comparing the feedback signal to a third threshold and generating assertions of the low load signal based on comparing the feedback signal to the third threshold.

20. The method of claim 19, wherein generating the dead-time signal comprises comparing the feedback signal to a fourth threshold and generating the dead-time signal based on comparing the feedback signal to the fourth threshold.

* * * * *